(12) United States Patent
Kaikkonen et al.

(10) Patent No.: US 8,204,098 B2
(45) Date of Patent: Jun. 19, 2012

(54) CONTROL SIGNALING FOR MULTIPLE CARRIER HIGH SPEED UPLINK PACKET ACCESS IN RADIO FREQUENCY COMMUNICATION SYSTEMS

(75) Inventors: Jorma Johannes Kaikkonen, Oulu (FI);
Arto Johannes Lehti, Oulu (FI);
Sami-Jukka Hakola, Kempele (FI)

(73) Assignee: Nokia Corporation, Espoo (FI)

( * ) Notice: Subject to any disclaimer, the term of this patent is extended or adjusted under 35 U.S.C. 154(b) by 188 days.

(21) Appl. No.: 12/819,984

(22) Filed: Jun. 21, 2010

(65) Prior Publication Data

US 2010/0322291 A1 Dec. 23, 2010

Related U.S. Application Data

(60) Provisional application No. 61/218,775, filed on Jun. 19, 2009.

(51) Int. Cl.
*H04B 1/00* (2006.01)
(52) U.S. Cl. ........ 375/147; 375/135; 375/136; 375/146; 375/148; 375/219
(58) Field of Classification Search ................... 375/130, 375/135–136, 144, 146–148, 219, 324, 349
See application file for complete search history.

(56) References Cited

U.S. PATENT DOCUMENTS

2010/0272268 A1* 10/2010 Sambhwani et al. ......... 380/287

OTHER PUBLICATIONS

"3$^{rd}$ Generation Partnership Project; Technical Specification Group Radio Access Network; Physical Layer Aspects of UTRA High Speed Downlink Packet Access (Release 4)," 3GPP TS 25.848, V4.0.0, Apr. 5, 2001, pp. 1-89.
"3$^{rd}$ Generation Partnership Project; Technical Specification Group Radio Access Network; Dual Cell HSPDA Operation," 3GPP TR 25.825, V1.0.0, Jun. 12, 2008, pp. 1-67.
"3$^{rd}$ Generation Partnership Project; Technical Specification Group Radio Access Network; Multiplexing and Channel Coding (FDD) (Release 8)," 3GPP TS 25.212, V8.5.0, Mar. 5, 2009, pp. 1-107.

(Continued)

*Primary Examiner* — Curtis Odom
(74) *Attorney, Agent, or Firm* — Harrington & Smith

(57) ABSTRACT

Systems and methods for providing an efficient mechanism for transmitting information needed to receive a secondary carrier over an existing message protocol on a primary carrier for a multiple carrier capable communications terminal. The receiver terminal may receive, on a primary carrier, a message containing information including a timing offset and a cell identification for a secondary carrier, for example. The communications terminal may then correlate a receiver to receive the secondary carrier without the need for a separate synchronization signal on the secondary carrier. These embodiments result in additional efficiency in a communications system.

17 Claims, 6 Drawing Sheets

OTHER PUBLICATIONS

"3rd Generation Partnership Project; Technical Specification Group Radio Access Network; Spreading and Modulation (FDD) (Release 8)", 3GPP TS 25.213, V8.4.0, Mar. 5, 2009, pp. 1-36.

"3rd Generation Partnership Project; Technical Specification Group Radio Access Network; Physical Channels and Mapping of Transport Channels Onto Physical Channels (FDD) (Release 8)," 3GPP TS 25.211, V8.4.0, Mar. 10, 2009, pp. 1-56.

"3rd Generation Partnership Project; Technical Specification Group Radio Access Network; Physical Layer Procedures (FDD) (Release 8)," 3GPP TS 25.214, V8.6.0, Jun. 8, 2009, pp. 1-92.

Seidel, E., "Technology of High Speed Packet Access (HSPA)," Oct. 2006, Nomor Research GmbH, Munich, Germany, pp. 1-5.

Seidel, E., et al., "White Paper—Dual Cell HSDPA and its Future Evolution," Jan. 2009, Nomor Research GmbH, Munich, Germany, pp. 1-5.

* cited by examiner

CONTROL SIGNALING FOR MULTIPLE CARRIER HIGH SPEED UPLINK PACKET ACCESS IN RADIO FREQUENCY COMMUNICATION SYSTEMS

This application claims the benefit of U.S. Provisional Application No. 61/218,775 entitled "Control Signaling for Multiple Carrier High Speed Uplink Packet Access in Radio Frequency Communication Systems," filed on Jun. 19, 2009, which is incorporated herein by reference.

TECHNICAL FIELD

The present invention is directed, in general, to communication systems and, more particularly, to systems and methods for providing multiple carrier high speed uplink packet access terminals, for example dual carrier high speed uplink packet access (DC-HSUPA) configured communications terminals, in a packet based radio frequency communication system.

BACKGROUND

As wireless communication systems such as cellular telephone, satellite, and microwave communication systems become widely deployed and continue to attract a growing number of users, there is a pressing need to accommodate a large and variable number of communication subsystems transmitting a growing volume of data with a fixed resource such as a fixed channel bandwidth accommodating a fixed data packet size. Traditional communication system designs employing a fixed resource (e.g., a fixed data rate for each user) have become challenged to provide high, but flexible, data transmission rates in view of the rapidly growing customer base.

The third generation partnership project long term evolution ("3GPP LTE") is the name generally used to describe an ongoing effort across the industry to improve the universal mobile telecommunications system ("UMTS") for mobile communications.

Recently, extensions of the 3GPP standards include the support for UEs and NBs performing high speed packet access (HSPA). High speed packet access communications are particularly appropriate for bursty, date intensive service applications. For example, voice over internet protocol (VoIP) and video broadcasting to and from mobile devices over an air interface are very bursty in nature. The addition of HSPA capability is expected to provide mobile users with a broadband experience that is similar to, or even supplants and replaces, a wired broadband connection, and is particularly useful for video download/upload, audio download/upload, VoIP, internet browsing, and transmission of large data files and/or audio or video streams in a time sensitive manner. VoIP service in particular places high demand on the system as the transmission of digitized voice signals must occur quickly enough, and the system must be responsive enough, to avoid the voice users ever experiencing noise or delay in the voice communications that is caused by waits in the system.

In wideband CDMA (WCDMA) based systems HSPA provides high speed downlink packet access (HSDPA) and high speed uplink packet access (HSUPA). Further, as the need for additional performance in mobile systems including the UMTS terrestrial radio access network (UTRAN) and the more advanced evolved UTRAN (E-UTRAN) systems continues, improvements referred to as evolved HSPA are being defined. One improvement to further increase performance in HSPA enabled systems is the use of dual cell or sometimes dual carrier HSPA (DC_HSPA). By using additional carriers or cells to carry data to and from a communications terminal at high speed, additional capacity for data throughput is made available.

The improvements are being made to cope with continuing new requirements and the growing base of users, and higher data rates and higher system capacity requirements. Goals of this broadly based project include improving communication efficiency, lowering costs, improving services, making use of new spectrum opportunities, and achieving better integration with other open standards and backwards compatibility with some existing infrastructure that is compliant with earlier standards.

The wireless communication systems as described herein are applicable to, for instance, UTRAN and E-UTRAN compatible wireless communication systems and WCDMA systems that support HSPA.

In the UTRAN architecture, radio network subsystems (RNS) are divided into portions including the radio network controller (RNC) and several base stations (referred to as a Node B or enhanced Node B (eNB) in the 3GPP specifications). Mobile communication terminals such as cell phones are referred to as user equipments (UEs). Each Node B/eNB may be in radio contact with multiple UEs (generally, user equipment including mobile transceivers or cellphones, although other devices such as fixed cellular phones, mobile web browsers, laptops, PDAs, MP3 players, and gaming devices with transceivers may also be UEs) via the radio Uu interface.

In the UTRAN architecture, a core network (referred to as CN) may be connected to any one of several external networks, or more than one, including networks such as the Public Switched Telephone Network (PTSN), the Integrated Services Digital Network (ISDN) and, of course, the Internet.

There are several different connections between the network elements that make up the telecommunications system. An Iu interface connects the CN to the UTRAN elements. An interface referred to as LUR connects Node Bs. A radio network layer (RNL) protocol is provided for signaling on the LUR interface and is referred to as the radio network subsystem application part (RNSAP). An RNC is connected to a Node B by an interface referred to as Iu. The Iu interface allows communications of required radio resources to the Node B from the RNC. This interface is then used by the RNC to configure the network and allocate resources such as cells controlled by a Node B, and to configure channels for communications to the UEs.

Importantly, one Node B or eNB can serve multiple cells. A UE is connected to a Node B through an interface referred to as the Uu interface. The UE has a subscriber identity module (USIM) and mobile equipment (ME). The ME includes the radio transceiver, and the hardware and software functions that are used by the user to make calls, send messages, transmit video and photographs, send email, browse the web and so forth on the mobile device.

In the present discussion, particular attention is paid to the HSPA. The HSPA includes HSDPA and HSUPA for downlink and uplink transmissions. The HSDPA has several dedicated channels, including the HS-DCH (high speed downlink channel) which is further divided into the HS-DPCH, the high speed dedicated physical channel and the HS-DCCH, the high speed dedicated control channels, which are present in both the downlink and the uplink. A shared channel, the high speed downlink shared channel (HS-DSCH) may be mapped on a high speed physical downlink shared channel (HS-PDSCH) or more than one in the physical layer.

The lowest layer of communication in the UTRAN or e-UTRAN system, Layer 1, is implemented by the Physical Layer ("PHY") in the UE and in the Node B or e-Node B. The PHY performs the physical transport of the packets between them on an over the air interface using radio frequency signals. In order to ensure a transmitted packet was received, an automatic retransmit request ("ARQ") and a hybrid automatic retransmit request ("HARQ") approach is provided. Thus, whenever the UE receives packets through one of several downlink channels, including dedicated channels and shared channels, the UE performs a communications error check on the received packets, typically a Cyclic Redundancy Check ("CRC"), and in a later subframe following the reception of the packets, transmits a response on the uplink to the e-Node B or base station. The response is either an Acknowledge ("ACK") or a Not Acknowledged ("NACK") message. If the response is a NACK, the e-Node B automatically retransmits the packets in a later subframe on the downlink ("DL"). In the same manner, any uplink ("UL") transmission from the UE to the e-Node B is responded to, at a specific subframe later in time, by a NACK/ACK message on the DL channel to complete the HARQ. In this manner, the packet communications system remains robust with a low latency time and fast turn-around time.

The use of HSPA in the downlink (HSDPA), from the NB or eNB to the UE, is fairly well understood by the existing or proposed standard documents. The support for HDSPA is provided by defined and agreed standard transport channels. The HS-DSCH is defined and supports adaptive coding and modulation. A scheduler function is provided at the Node B level that provides dynamic resource allocations. Signaling is provided to users on the downlink control channel, the High Speed Signaling Control Channel (HS-SCCH); including information such as UE identity, using a UE specific field including cyclic redundancy check (CRC) for addressing a specific UE on the shared channel, fields such as the Transport Format and Resource Indicators (TRFI) for identifying a scheduled resource and a transmission format, and support for hybrid automatic retransmission requests (HARQ). As defined, each UE using the HSDPA downlink may monitor up to four HS-SCCH channels. An uplink transport is defined for the UE to send uplink traffic, the High Speed Dedicated Physical Control Channel (HS-DPCCH) which allows transmission of channel quality information (CQI) and ACK/NACK information for HARQ support. For example, reference is made to the document provided by the 3GPP standards setting organization at www.3gpp.org entitled "Media Access Control (MAC) Protocol Specification; Release 8.5.0", numbered Technical Specification 25.321, which document is herein incorporated by reference.

For high speed uplink packet access (HSUPA), sometimes referred to as Enhanced Uplink (EUL), a different scheme is defined. The channel definitions are different because the uplink transmissions use non-orthogonal signal transmission. Transport channels are referred to as Enhanced Dedicated Channels (E-DCH). An important aspect for uplink transmissions on dedicated channels on shared radio resources is the UE power control needed to address the near-far transmitter problems, so that UEs physically near the receiving NB do not "stomp out" uplink traffic from remotely located UEs. In addition, UE handoff is supported including "soft" or "softer" handoffs. In UE handoffs, the UE may be transmitting to more than one receiving NB or eNB. Thus, the radio network controller (RNC) may be configured to put together these disparate uplink packet messages in the correct order. Packets may be received by differing NBs, and packets may be received in duplicate form due to the handoff procedure. Thus, the RNC may be configured to reorder and restore the original sequence of packets.

Additional channels have been defined for the HS uplink, including the enhanced dedicated physical data channel, or E-DPDCH, for dedicated uplink data transmission. This channel transports packets including scheduling information, buffer status and the like. The enhanced dedicated physical control channel, E-DPCCH, provides control information for decoding and detecting the E-DPDCH channel. Also, some information may be provided to inform the resource scheduler if the UE has resources (e.g., sufficient uplink data for transmission ready in the UE data buffers) for transmission. Additional handshake or control channels include the enhanced HARQ Acknowledgement Indicator Channel (E-HICH) for transmitting HARQ signals such as ACK/NACK signals to the sender. Some channels are defined for resource allocation to the UE, the enhanced relative grant channel (E-RGCH) and the enhanced absolute grant channel (E-AGCH) which provide a transport channel to enable the eNB to allocate resources to one, or one of several, UEs.

Because the HARQ protocol requires support of out of order delivery of the ACK/NACK responses, a reordering function is required in higher layer protocols. Thus, a separate higher layer service is defined, at the MAC level, called MAC-es/MAC-is. This layer is located at the RNC because the UE may be in soft and softer handover and thus, the packets on the uplink transport channel may be received by different eNBs or NBs. Some packets may be repeated or lost as the UE transmits during the handoff, and the RNC may be able to recover those packets using CRC and error detection and correction techniques on the reordered packets.

Additional features have been defined for the high speed packet access communications. The concept of dual cell or dual carrier HSPA (DC-HSPA) extends the performance of HSPA. In DC-HSPA, two carriers are used to communicate high speed packets to and from UEs by an eNB. This capability is particularly useful as the signal carriers are often assigned in 10-15 Mhz spectrum pairs, so by using both pairs, additional system performance is attained using already allocated bandwidth. In the downlink case, the DC-HSDPA protocols have been defined, including a primary or anchor carrier and a secondary carrier connected to two UEs from a single eNB, or alternatively, two carriers connected to a single UE. By using advanced load carrying, the capacity of the transport channels may be increased over the use of single carrier HSDPA. For the DC-HSDPA, the relationships between the primary carrier and the secondary carrier are such that the receiver (UE) can locate one carrier and then, without the necessity of doing a blind search, set its receiver filtering properly to receive the second carrier.

For the uplink case (transmissions from one or two UEs to a NB over the dual carriers), the use of dual carriers is presently contemplated, but the signaling considerations are different. Requiring support for handoff of the UE from one NB to another means that the packets communicated on the uplink transport facility from the UE may be received at more than one NB. Thus, a higher level layer must perform a reordering. Further, the secondary carrier may not be easy to locate. The need for determining the secondary carrier receiver information is also complicated. Unlike the downlink case, the location or time parameters of the secondary carrier may not be known or easily determinable from the primary carrier properties. The NB could perform a blind search for the carriers but this approach, while feasible, would impose unacceptable burdens on the system and reduce performance, thus undoing gains that are sought by the use of the dual carrier scheme.

A need thus exists for systems and methods to efficiently provide the signaling needed to support the DC-HSUPA capability for UEs and NBs in an over the air interface radio frequency communications system, with efficient approaches provided to eliminate or reduce the need for blind searches and to prevent errors, and without the disadvantages of the known prior approaches.

SUMMARY OF THE INVENTION

These and other problems are generally solved or circumvented, and technical advantages are generally achieved, by advantageous embodiments of the present invention which include an apparatus and methods according to an embodiment for efficiently signaling control channel information for a multiple carrier HSUPA facility, such as a DC-HSUPA facility.

In one exemplary embodiment, an active set update (ASU) message contains information about the relationship between a primary carrier and a corresponding secondary carrier for use by a dual carrier capable UE. The UE can then set the finger allocations needed to receive the primary and secondary carriers in a RAKE receiver. The ASU message may include information including, but not limited to, cell ID, CPICH information, and a time offset difference between the primary and secondary carrier. If more carriers are used in alternative embodiments, then additional information about additional carriers is also provided in the ASU message to enable the RAKE receiver to be configured to receive these carriers.

Additional exemplary embodiments of the present invention include providing, in a message transmitted to a UE on a secondary carrier, the information about a co-allocated primary carrier. Embodiments further include messages containing information needed to extend the dual carrier capability to tertiary, quaternary and more carriers. The carriers indicated in the ASU messages may or may not be presently in the active set of the UE. New cells could be added in either the secondary or primary carrier active sets using the active set update messages to the UE.

In another alternative embodiment, the additional information about the relationship between the primary carrier and other additional carriers, such as secondary carriers, may be provided on neighboring cell information messages transmissions received by a UE. By having neighboring cells transmit the additional information, the ways in which the UE can receive this information increase. Because these fields are added to already present messages transmitted by the neighboring cells, such as an active set update message, no hardware changes are required.

The foregoing has outlined rather broadly the features and technical advantages of the present invention so that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the invention, reference is now made to the following descriptions taken in conjunction with the accompanying drawing, in which.

DETAILED DESCRIPTION

Figure 1:
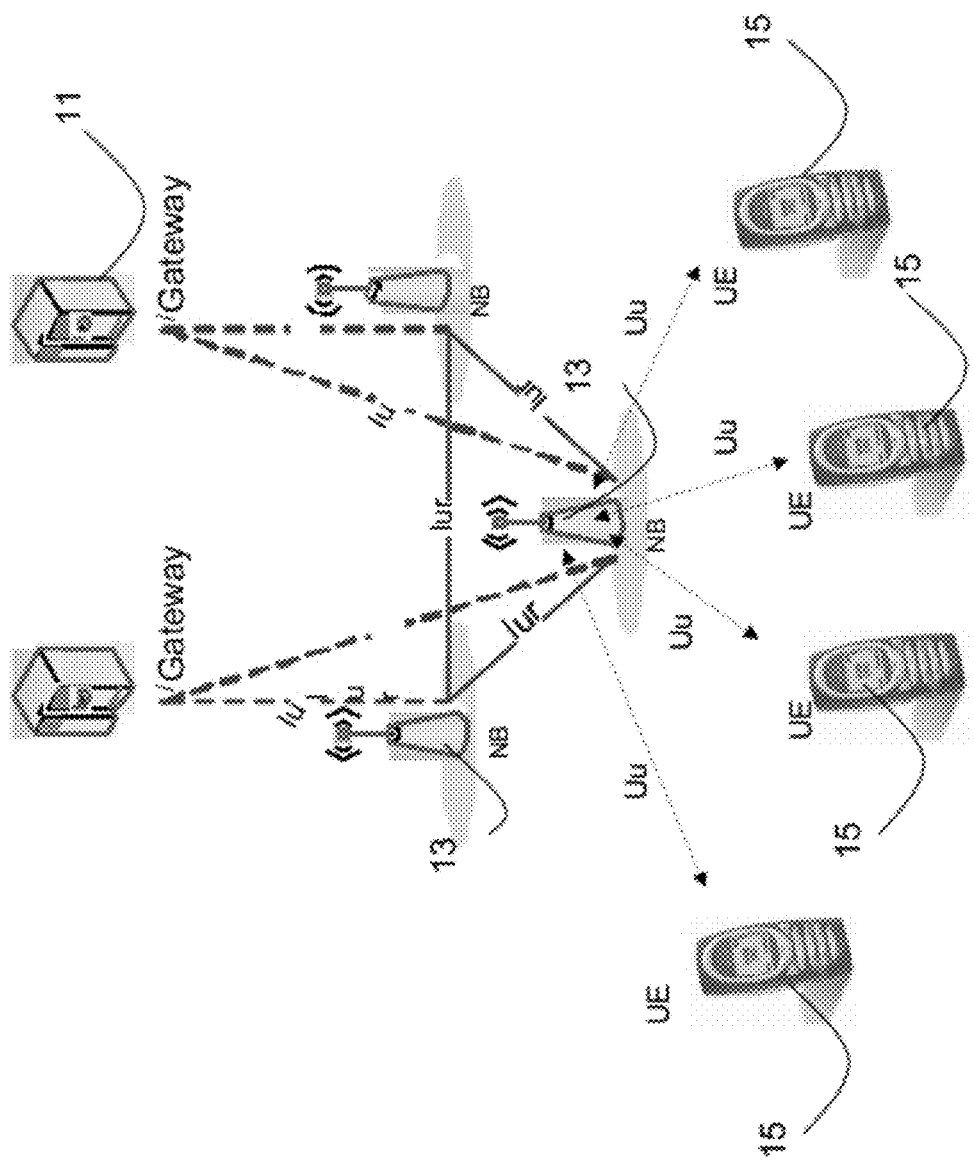
FIG. 1 illustrates user equipment communicating from a Node B to a variety of UEs over an air interface, and a UTRAN communications system according to an advantageous embodiment of the present invention.

Referring initially to FIG. 1, a system level diagram for a wireless communication system that provides an environment for the application of the principles of the present invention is illustrated. The wireless communication system provides an example UTRAN architecture including base stations 13 providing UTRAN user plane (packet data convergence protocol/radio link control/media access control/physical transport) and control plane (radio resource control) protocol terminations directed toward user equipment 15. The base stations 13 are shown interconnected with an LUR interface or communication link. The base stations 13 are also connected by an Iu interface or communication link to a Gateway 11. The Iu interface supports a relationship between the CN entities and the base stations and supports a functional split between the CN and the UTRAN network entities.

The base stations 13 may host functions such as radio resource management (e.g., internet protocol ("IP"), header compression and encryption of user data streams, ciphering of user data streams, radio bearer control, radio admission control, connection mobility control, and dynamic allocation of resources to user equipment in both the uplink and the downlink). Additional functions may include selection of a Gateway 11 at the user equipment attachment, routing of user plane data towards the user plane entity, scheduling and transmission of paging messages (originated from the mobility management entity), scheduling and transmission of broadcast information (originated from the Gateway 11 or operations and maintenance), and measurement and reporting configuration for mobility and scheduling.

Figure 2:
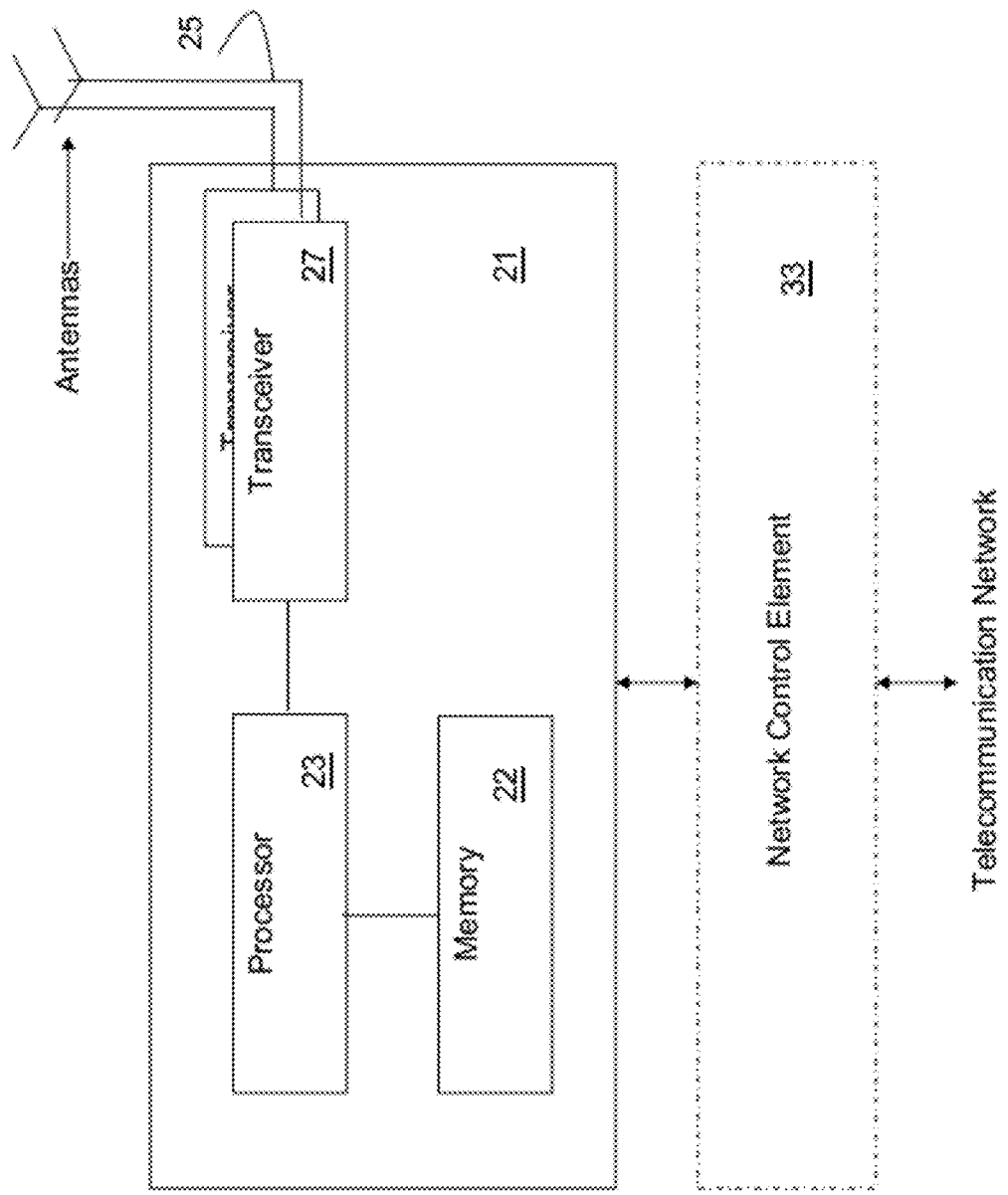
FIG. 2 illustrates a block diagram of a communication element according to an advantageous embodiment of the present invention.

FIG. 2 illustrates a simplified system level diagram of an example communication element of the communication system. FIG. 2 provides an illustration of an environment and structure for application of the principles of the present invention. The communication element may represent, without limitation, an apparatus including a base station, user equipment, such as a terminal or mobile station, a network control element, or the like. The communication element 21 includes, at least, a processor 23, memory 22 that stores programs and data of a temporary or more permanent nature, for example the UTRAN USIM may be stored in memory 22, one or more antennas 25, and a radio frequency transceiver 27 coupled to the antenna and the processor for bidirectional wireless communication. Other functions may also be provided. The communication element 21 may provide point-to-point and/or point-to-multipoint communication services.

The communication element 21, such as a base station in a UTRAN WCDMA network, may be coupled to a communication network element 33, such as a gateway coupled to a PTSN. The network control element may, in turn, be formed with a processor, memory, and other electronic elements (not shown). Network access may be provided using fiber optic, coaxial, twisted pair, microwave communication, or similar communication links coupled to an appropriate link-terminating element. A communication element 21 formed as a mobile station is generally a self-contained device intended to be carried by an end user and connects wirelessly to a Node B/eNB, thus in that case, it is not directly connected to element 33.

The processor 23 in the communication element 21, which may be implemented with one or a plurality of processing devices, performs functions associated with its operation including, without limitation, encoding and decoding of individual bits forming a communication message, formatting of information, and overall control of the communication element, including processes related to management of resources. Exemplary functions related to management of resources include, without limitation, hardware installation, traffic management, performance data analysis, tracking of end users and mobile stations, configuration management, end user administration, management of the mobile station, management of tariffs, subscriptions, and billing, and the like. The execution of all or portions of particular functions or processes related to management of resources may be performed in equipment separate from and/or coupled to the communication element, with the results of such functions or processes communicated for execution to the communication element. The processor of the communication element 21 may be of any type suitable to the local application environment, and may include one or more of general-purpose computers, special-purpose computers, microprocessors, digital signal processors ("DSPs"), and processors based on a multi-core processor architecture, as non-limiting examples.

The transceivers 27 of the communication element 21 modulate information onto a carrier waveform for transmission by the communication element via the antennas 25 to another communication element. The transceiver demodulates information received via the antennas for further processing by other communication elements. In FIG. 2, the device 21 has multiple antennas 25 and corresponding transceivers 27.

The memory 22 of the communication element 21, as introduced above, may be of any type suitable to the local application environment, and may be implemented using any suitable volatile or non-volatile data storage technology, such as a semiconductor-based memory device, a magnetic memory device and system, an optical memory device and system, fixed memory, and removable memory. The programs stored in the memory may include program instructions that, when executed by an associated processor, enable the communication element to perform tasks as described herein. Exemplary embodiments of the systems, subsystems, and modules as described herein may be implemented, at least in part, by computer software executable by processors of, for instance, the mobile station and the base station, or by hardware, or by combinations thereof. Other programming may be used such as firmware and/or state machines. As will become more apparent, systems, subsystems and modules may be embodied in the communication element as illustrated and described above. Further, the communication element 21 may store in memory 22 various information that persists, including configuration information, for use in communicating over the air interface.

FIG. 2 depicts a communication element 21 that has multiple antennas 25. Current specifications for the 3G standard contemplate eNBs with 1, 2 or 4 antennas, likewise UEs may have 1, 2 or 4 antennas, and these multiple antenna arrangements may be extended to more than 4 in future standards. For a MU-MIMO UE, at least 2 antennas and associated transceiver circuitry may be provided.

Figure 3:
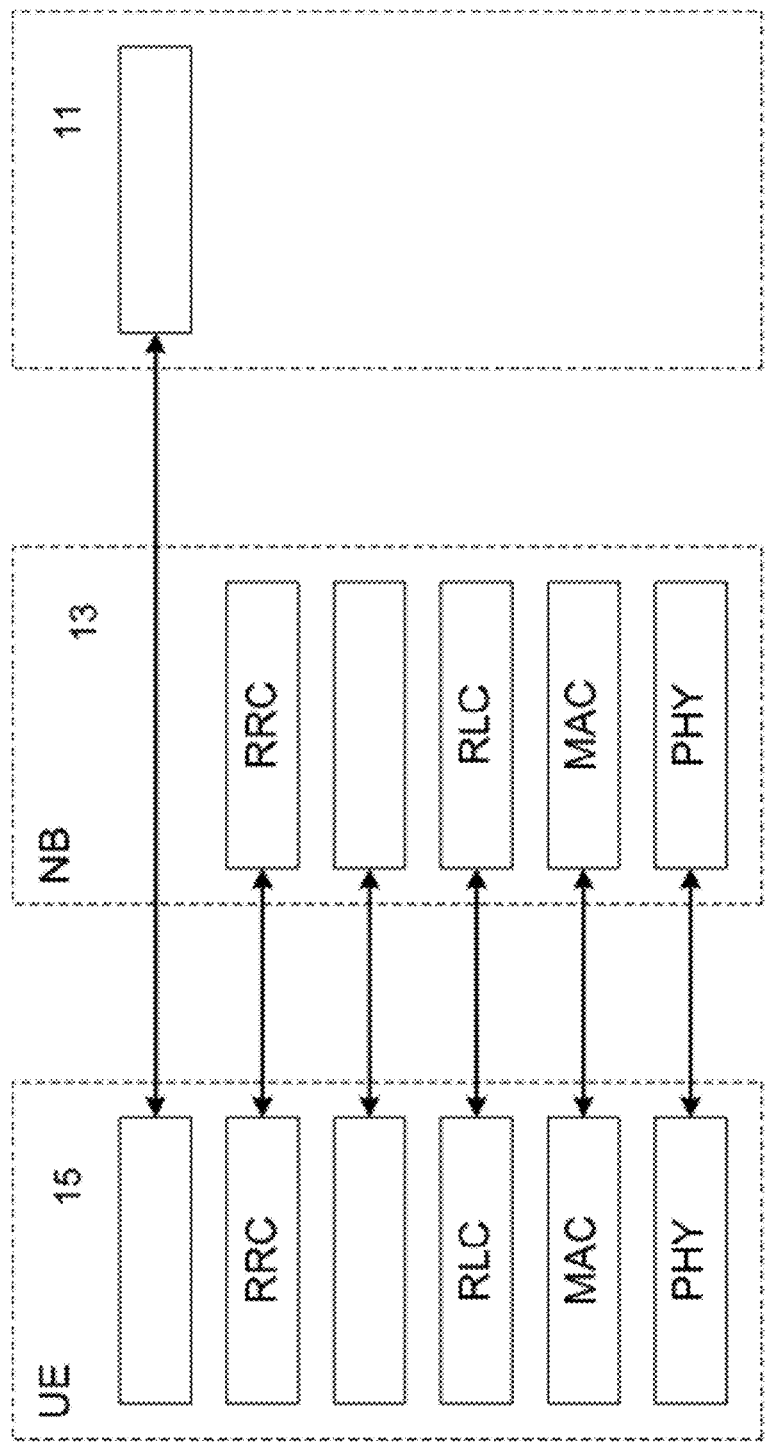
FIG. 3 illustrates communication layers of a UE, NB and a gateway according to an advantageous embodiment of the present invention.

FIG. 3 depicts a block diagram of an embodiment of user equipment 15 and a base station 13 constructed according to the principles of the present invention. The user equipment UE 15 and the base station NB 13 each include a variety of layers and subsystems: the physical layer ("PHY") or Layer 1 subsystem, a medium access control layer ("MAC") subsystem, a radio link control layer ("RLC") subsystem, and a radio resource control layer ("RRC") subsystem. The RLC and MAC subsystems are at Layer 2.

The physical layer subsystem supports the physical transport of packets over the air interface and provides, as non-limiting examples, cyclic redundancy check ("CRC") insertion (e.g., a 24 bit CRC is a baseline for physical downlink shared channel ("PDSCH"), channel coding, physical downlink control channel ("PDCCH") coding, physical layer hybrid-automatic repeat or retransmit request ("HARQ") processing, and channel interleaving. The physical layer subsystem also performs scrambling such as transport-channel specific scrambling on a downlink-shared channel ("DL-SCH"), broadcast channel ("BCH") and paging channel ("PCH"), as well as common multicast channel ("MCH") scrambling for all cells involved in a specific multimedia broadcast multicast service single frequency network ("MB-SFN") transmission. The physical layer subsystem also performs signal modulation such as quadrature phase shift keying ("QPSK"), 16 quadrature amplitude modulation ("16 QAM") and 64 QAM, layer mapping and pre-coding, and mapping to assigned resources and antenna ports. The media access layer or MAC performs the HARQ functionality and other important functions between the logical transport layer, or Layer 2, and the physical transport layer, or Layer 1.

Each layer is implemented in the system and may be implemented in a variety of ways. A layer such as the PHY in the UE 15 may be implemented using hardware, software, programmable hardware, firmware, or a combination of these as is known in the art. Programmable devices such as DSPs, reduced instruction set ("RISC"), complete instruction set ("CISC"), microprocessors, microcontrollers, and the like may be used to perform the functions of a layer. Reusable design cores or macros as are provided by vendors as ASIC library functions, for example, may be created to provide some or all of the functions and these may be qualified with various semiconductor foundry providers to make design of new UEs, or e-Node B implementations, faster and easier to perform in the design and commercial production of new devices.

For additional information about the physical layer implementation and configurations for 3GPP, Release 8, reference is made to the Technical Specification numbered TR 25.825, entitled "Technical Specification Group Radio Access Network, Dual Cell HSPDA Operation; Release 8", version 1.0.0, dated Jun. 12, 2008, and available from the 3GPP organization at www.3gpp.org, which is hereby incorporated by reference herein it its entirety. Reference is also made to the Technical Specification numbered 3GPP TS 25.211, version 8.4.0, dated Mar. 10, 2009, entitled "Physical Channels and Mapping of Transport Channels Onto Physical Channels (FDD)" (hereinafter, "TS 25.211"); the Technical Specification numbered 3GPP TS 25.212, version 8.5.0, Mar. 5, 2009, entitled "Multiplexing and Channel Coding (FDD)" (hereinafter "TS 25.212"); the Technical Specification numbered 3GPP TS 25.213, version 8.4.0, dated Mar. 5, 2009, entitled "Spreading and Modulation (FDD)" (hereinafter "TS 25.213"), the Technical Specification numbered 25.214, version 8.6.0, dated Jun. 8, 2009, entitled "Physical Layer Procedures (FDD)" (hereinafter "TS 25.214") and the Technical Specification numbered 3GPP TR25.848, version 4.0.0, dated Apr. 5, 2001, entitled "Physical Layer Aspects of UTRA High Speed Downlink Packet Access; Release 4" (hereinafter "TS 25.848"), each of which is hereby incorporated by reference herein in its entirety. Each of these documents is available from the 3GPP website at the URL www.3gpp.org.

Embodiments of the present invention provide additional signaling needed to support the use of multiple carrier HSPA, such as for example DC HSPA in the uplink direction, e.g., DC HSUPA. Additional transport channels are defined for support of the high speed package access capabilities. These include, without limitation, the common pilot channel (CPICH), the enhanced dedicated channel (E-DCH) which is the transport channel for user data, the HARQ indicator channel (E-HICH), and a downlink physical channel used for transmitting to a UE the ACK/NACK responses for uplink packet transmissions on the E-DCH. The enhanced relative grant channel (E-RGCH) is a downlink channel used for transmitting step-up/step-down scheduling commands that affect the relative transmission power the UE is allowed to use for data transmission on the E-DCH. The enhanced absolute grant channel (E-AGCH) is a downlink physical channel to signal absolute values for the serving grant for UEs.

Synchronization channels are provided. The synchronization channel SCH consists of the primary synchronization channel (P-SCH) and the secondary synchronization channel (S-SCH). These channels are used by the communication terminal or UE to find the cells, and these channels are not under a cell-specific scrambling code. For example, the P-SCH contains a code word with 256 chips, with an identical code word in every cell. Using the information on the P-SCH, the user equipment or communications terminal gets slot synchronization. From the SCH, the UE gets frame synchronization and in addition, code group information about which code group the NB belongs to.

The radio receivers employ a RAKE receiver. A RAKE receiver has several sub-receivers usually referred to as "fingers" and these sub-receivers independently decode different received carriers. The correlation of the "fingers" therefore has to be assigned to enable the receiver to discriminate between multiple signals received in the same or similar times.

The 3GPP UEs are also capable of operating during Soft or Softer Handover. In Soft Handover, the UE is simultaneously controlled by two or more cells, the cells belonging to different NBs. In Softer Handover, the UE is controlled by two or more cells controlled underneath one NB or eNB.

The Active Set Usage (ASU) message indicates which cells are currently participating in a Soft or Softer Handover of a UE. The E-DCH active set is a subset of the DCH active set. A cell is in the "active set" when the UE is connected to a cell of a Node B. Since the UE is typically a mobile device, and it supports Soft or Softer Handover, the UE may be connected to several cells and these may be at the same or different Node Bs. The UE may therefore be receiving multiple channels such as E-HICH. Cells may be the "serving cell" providing for E-DCH for a UE, or the "non-serving cell". The serving cell may transmit for E-DCH communications the absolute grants on the E-AGCH channel, as well as the relative grants on E-RGCH and the HAGQ indicators on E-HICH.

When the active set changes, an active set update (ASU) message is transmitted to the UE by the radio network controller (RNC). Thus, the UE receives timely information about the identity of active cells. If the multiple carrier facility, such as a dual carrier or dual cell facility is supported, then when either the primary channel active set usage or the secondary channel active set usage changes, an active set update message would be transmitted to the UE on the appropriate carrier by the RNC.

For the DC-HSDPA case, the 3GPP standard already contemplates transmitting the synchronization channel information P-SCH and S-SCH on the primary carrier. In this case, the cell search is performed by the UE only on the primary downlink carrier. The secondary carrier can then be located by the UE because, in the DC HSDPA specifications as currently proposed, the carriers are coupled in the same sector, and their timing difference is allowed to within ¼ chip. Thus, in the case of DC-HSDPA, the UE can locate the secondary carrier from the information it receives about the primary carrier.

Figure 4:
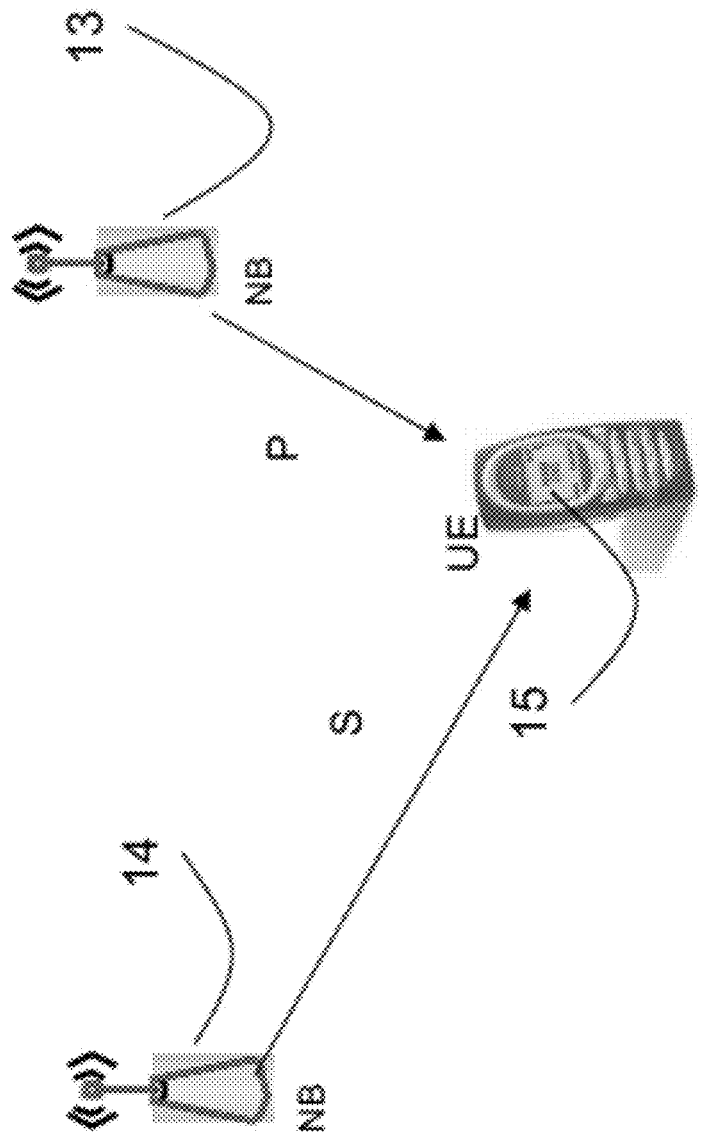
FIG. 4 illustrates in one example a known system and method for providing carrier information to a dual carrier UE.

For an illustrative example of a known approach, in FIG. 4, terminal UE 15 is in communication with two carriers located at different NBs 13 and 14. The primary carrier "P" includes a synchronization channel signal, as does the secondary carrier "S" from NB 14. Thus, in this non-limiting example, the receiver has to separately synchronize to each carrier by determining the time settings using a correlation function (assign fingers of the UEs RAKE receiver) to synchronize with each channel. These requirements place an additional signaling burden on the system (the secondary carrier must transmit synchronization channel) and on the receiver in the UE. Further, in some cases, this may not be necessary, as in the case when the primary and secondary are co-allocated and time aligned, the receiver could find the secondary without the correlation operation if the receiver had the appropriate information.

However, in the exemplary DC-HSUPA case, a different approach to providing carrier information is required. Because the UE is likely connected to several cells, it is receiving certain HSUPA channel messages from the serving cells and from the non-serving cells as well. It is likely that these related control signals for each carrier will be correspondingly transmitted on different carriers and are not mapped onto a single carrier. Accordingly, the UE needs to have a capability for configuring a RAKE receiver to receive these channels also on the secondary carrier. If multiple carrier capability beyond dual carriers is added, as is currently being considered, these requirements and needs become even more costly to implement using the known approaches.

In one approach, where there is a synchronization signal on both carriers, the UE may be able to do a cell search on both the secondary and primary carriers. This is not an efficient approach in the case where the two carriers would be co-allocated and time-aligned, because in this case, the search functionality is not needed.

Figure 5:
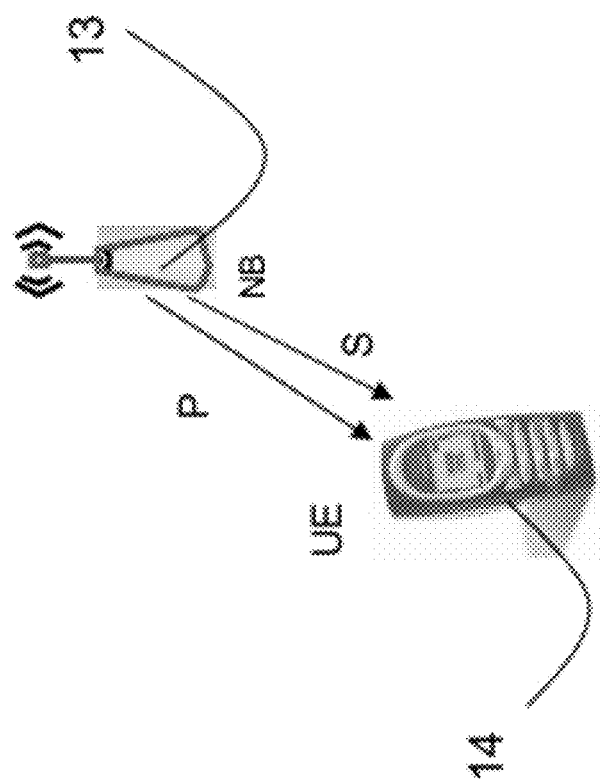
FIG. 5 illustrates in another example a known approach for providing carrier information to a dual carrier UE.

FIG. 5 depicts another known approach (using the dual carrier case as an example of a multiple carrier scenario). In FIG. 5, dual carrier capable UE 14 is in dual carrier communications with cells on a single Node B/eNB 13. This example is most like the present standard proposal for DC-HSDPA (downlink packets). In FIG. 5, UE 14 receives signals from two carriers labeled P and S from a single NB 13. The primary carrier P includes a sync channel, and the secondary carrier may be transmitted with or without a sync channel. In this example, the UE may locate the secondary carrier from known relationships between the two carriers; for example, the primary time to the secondary time offset may be <¼ chip, allowing the UE to locate the secondary channel without using the secondary synch channel.

However, for the DC-HSUPA or the multiple carrier HSUPA case, the carriers are not related in this manner and so the UE cannot use this simple approach to locate and receive the secondary carrier. Another approach is therefore needed.

In another simple known approach, the UE may perform a "blind search" using the CPICH (common pilot channel). The blind search would be performed using the scrambling code for the secondary carrier, but in the system as currently contemplated, the UE does not know where to search in the time domain, so the blind search would be required. Theoretically, such a blind search could be used, but if it were implemented, this approach would greatly increase the complexity of the UE and thus is not practicable. So far, no attempt to implement the UE receiver in this manner has been made.

Embodiments of the present invention provide alternative methods and systems for providing signaling about the secondary and primary carriers to a UE configured as a multiple carrier HSUPA terminal, such as a DC-HSUPA capable mobile communications terminal While recent industry proposals for DC-HSUPA do contemplate the use of dual carriers for high speed uplink packet access, the mechanisms for providing the information needed to implement this feature have not yet been determined The embodiments of the invention presented herein address this need.

Embodiments of the present invention provide a signaling scheme method and system for indicating the secondary, tertiary, or quaternary etc carrier to the UE receiver when configured for multiple carrier high speed uplink packet access, such as DC-HSUPA, applications. In one embodiment, the radio network controller (RNC) provides additional information on an active set update (ASU) message to the UE. For example, the ASU message may have a new field that includes the co-allocated carrier information. That is, when the active set changes for either the secondary or primary carriers used for DC-HSUPA, the RNC will transmit to the particular UE an active set update message that includes at least the co-allocated cell on the primary or secondary carrier. In one embodiment, the new message includes the corresponding pilot channel (CPICH) information. In this manner, the dual carrier HSUPA capable UE can locate the co-allocated carrier whenever a primary or secondary active set change occurs.

In another embodiment, the active set update message has a new field transmitted to the UE that includes at least the primary common pilot channel CPICH, the Cell ID which can be used to identify and select the co-allocated cell on the secondary or primary carrier, a time difference known as the SFN-SFN time difference (single frequency network-single frequency network) which may be used to identify the possible timing differences between the cells on different carriers if it exceeds one chip. Other timing differences may also be considered.

In another embodiment, the UE may know the primary carrier characteristics from a sync channel that is transmitted by a first NB from the serving cell. The secondary carrier may be provided, in one non-limiting example, from a different cell at a different Node B. The UE terminal may determine the appropriate RAKE receiver settings from a message on the primary carrier in the form of an active set update (ASU) message that indicates the secondary carrier's time offset (SFN-SFN). By using this information received on the primary carrier, the dual carrier UE may locate the secondary carrier by using only the information provided in the ASU message and there is no need for a separate SYNC channel on the secondary carrier.

In an alternative embodiment, the additional information about the relationship between the primary carrier and other additional carriers, such as a secondary carrier, may be provided on neighboring cells information messages transmissions. The UE in most of the HSPA capable systems also supports receiving messages from multiple NBs at a particular point in time, for example this capability is used to enable handovers. This facility also offers an additional communications means to provide the secondary carrier information. By having neighboring cells transmit the additional carrier information, the ways in which the UE can receive this information increase. Because these fields are added to already present messages transmitted by the neighboring cells, such as an active set update message, no hardware changes are required.

For example, a Neighbor Cell Information message contains information about the relationship between a primary carrier and a corresponding secondary carrier for use by a dual carrier capable UE. This may be extended to a multiple carrier capable UE as well. The UE can then set the finger allocations needed to receive the primary and secondary carriers in a RAKE receiver or use the information to configure some other receiver for example to mitigate neighboring cell information. The Neighbor Cell Information message may include information including, but not limited to, cell ID, CPICH information, and a time offset difference between the primary and secondary carrier.

Figure 6:
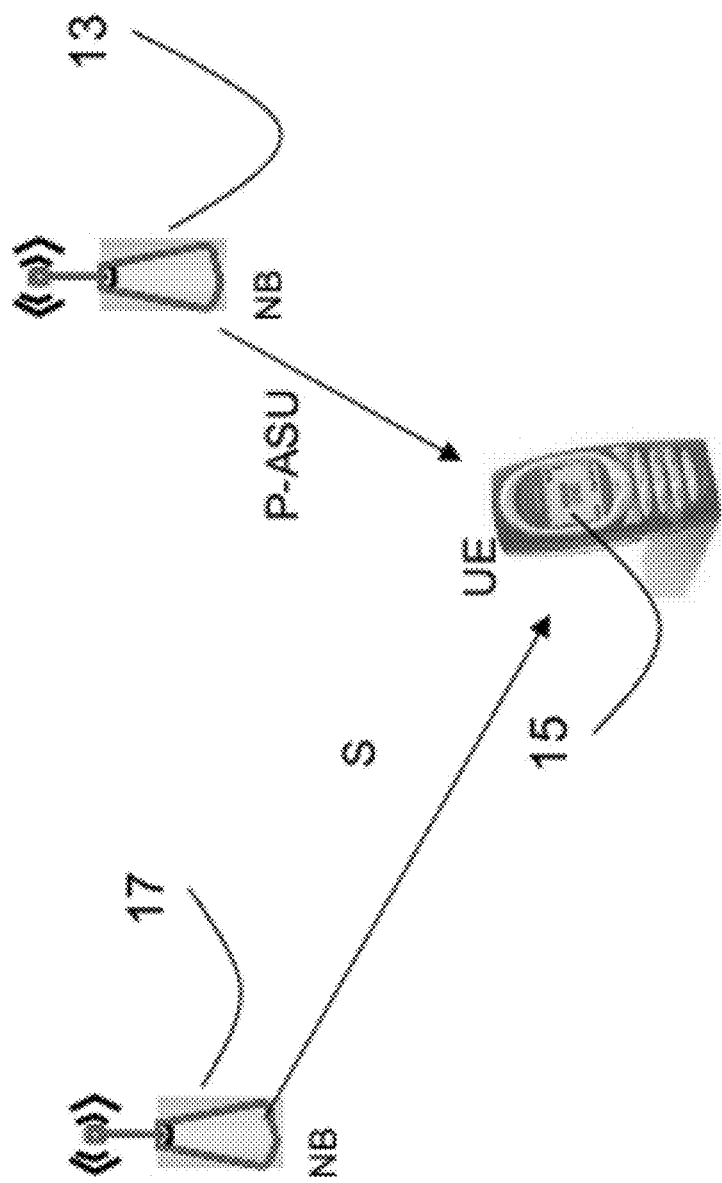
FIG. 6 illustrates in an exemplary embodiment a system and method for providing the required receiver information about the secondary carrier to a dual carrier.

FIG. 6 illustrates a non-limiting exemplary embodiment. In FIG. 6, an example case where the embodiments of the invention are utilized with dual carriers from two different Node B/eNBs is shown. UE 15 is receiving carriers from two different NBs in dual carrier high speed uplink packet access mode. NB 13 is transmitting the primary carrier P-ASU. NB 17 is transmitting the secondary carrier S. The primary carrier P also transmits active set update messages (ASUs) that indicate the primary carrier pilot channel CPICH, plus a synchronization message, and may include information such as a time offset correlating to the secondary carrier by primary carriers (time+the NB 17 SFN-SFN offset time). With these parameters in the ASU message, the receiver in the UE can locate the secondary carrier S without the need of a synchronization channel on S, and without doing a lengthy and impractical "blind search".

Note that although the descriptions above are primarily directed at an active set update message transmitted on a primary carrier, in alternative embodiments contemplated as part of the embodiments of the present invention herein and within the scope of any claims appended hereto, the UE may also receive information about the co-allocated primary carrier that corresponds to a secondary carrier in the same manner. That is, the embodiments of the invention include alternatives that contemplate transmission of information about the primary carrier corresponding to a secondary carrier added to the active set on a secondary carrier connected to a UE, as well as information about the secondary carrier that may be transmitted as a field in an active set update message on the primary carrier. Either way, the UE can locate the co-allocated carrier without a special search and without the need for a separate synchronization signal.

Tables 1 and 2 below depict in one non-limiting example embodiment the fields that may be used in a modified ASU message that incorporates the features of the invention.

Table 1 illustrates the information element that provides the corresponding cell information for FDD transmission. Table 2 further provides exemplary fields that might be used in the ASU message; for example, the primary carrier common pilot information channel (CPICH), the unique cell identification (Cell ID), and the SFN-SFN time difference between the primary and secondary carriers. This time difference when the embodiments are applied in a present system might be an integer value between 0 and 40961. Other integer values could be used as alternative embodiments and additional fields of information may be defined for the ASU to assist the UE in allocating the fingers of the RAKE receiver for reception of the secondary carrier (or alternatively, for reception of the primary carrier) in order to locate the second carrier of a dual carrier pair.

TABLE 1

| Information Element Group Name | Need | Multi | Type and Reference | Semantics Description |
|---|---|---|---|---|
| Corresponding cell on the primary/secondary carrier info FDD | OP | | Downlink Secondary Cell info FDD | Fdd Only |

TABLE 2

| Information Element/Group Name | Need | Multi | Type and Reference | Semantics Description |
|---|---|---|---|---|
| Primary CPICH info | MP | | Primary CPICH info | |
| Cell ID | OP | | Cell ID | |
| SFN-SFN time difference | OP | | Integer (0 . . . 40961) | According to T2_SFN_SFNTIME in [TS 25.133], 24574 spares are needed |

The exemplary embodiment of FIG. 6 is an example using DC-HSUPA capabilities. However, additional extensions of HSPA and DC-HSPA presently being considered include multiple carrier HSUPA. In that application, the ASU messages may be extended to identify additional carriers such as tertiary, quaternary, etc., carriers so that the RAKE receivers in the terminals can be configured to receive these carriers, without the need for any blind searches.

Additionally, as mentioned above, the example embodiment of FIG. 6 may be extended in an alternative embodiment where the neighboring cells also provide the added fields identifying the secondary (and tertiary and quaternary, etc.) carriers for configuring the receivers. This may be done in neighbor cell information messages. In this way, the UE has additional opportunities to receive the information, which takes advantage of the capability the UEs have to receive messages from several NBs at the same time, to support handover and serving cell changes. Because this embodiment approach takes advantage of a hardware capability already in place in the devices, no additional hardware design changes or system hardware costs are imposed.

Embodiments of the present invention are intended to be applied in communications systems, including but not limited to WCDMA multiple carrier HSPA systems, such as for example DC-HSPA enabled systems. In general, embodiments of the present invention provide a new proposal wherein in a channel for signaling on a physical downlink channel for transmitting messages, additional information to enable a UE to locate a secondary carrier for DC-HSUPA communications are provided by using an additional field in an otherwise existing ASU message. Thus, very few changes are required in the UE to implement and advantageously use the various embodiments of the invention, and no separate synchronization channel is needed on the secondary carrier. The added capability of the DC-HSUPA enabled mode is therefore provided, with a minimum cost in terms of system resources and signaling, and no hardware modifications are needed. Blind searches for the secondary carrier are eliminated.

The embodiments may be implemented as hardware, software, firmware, or combinations of these. For programmable receivers having a processor, microprocessor or the like that is capable of implementing steps of a method stored as computer instructions, the embodiments may be provided as executable code stored in a machine readable form. For example, in an embodiment a computer readable product storing instructions is provided which, when the instructions are executed by a programmable processor within a receiver, cause the receiver to receive additional fields in an ASU message on a first carrier, analyze the information stored in the additional fields, identify a secondary, tertiary, or quaternary carrier, and configure a RAKE receiver to receive these added carriers, without the need for a blind search; and receiving and transmitting packets on the secondary, tertiary, etc. carrier. The computer readable storage product may be a ROM, SRAM, EEPROM. FLASH memory, USB card, disk, diskette, DVD, or file that is transferred over an interface to the processor.

Although the description thus far describes, for illustrative purposes, primary and secondary carriers that are in one context, the embodiments of the invention are not so limited. For example, the ASU message may describe information about a secondary carrier including a cell from another Node B/eNB that is not in the active set. This information could also be applied in a reverse manner so as to add a new cell to the primary carrier active set when the cell already exists in the secondary carrier active set. Further, the active set update message could include information about the timing between cells if they cannot be assumed to be time aligned; for example, for those cells that are not supporting dual carrier operation. This timing information could then be used by the receiver to set a correlation phase in the receiver.

In an additional embodiment, the example dual carrier DC-HSPA scheme is extended to more than two carriers for high speed packet access, in which case the ASU message sent by the active set update embodiment may have additional fields that the UE can use to locate a third, fourth, etc., carrier. Thus, the embodiments are not limited to the dual carrier schemes presently being considered for standardization, but may easily be extended to additional carrier schemes by adding fields to the ASU message and configuring the UEs to receive such fields.

The use of the embodiments of the invention may be provided by changing software for a UE that is already dual carrier capable, without the need for additional hardware changes and thus, the embodiments are compatible with existing designs for UEs without the need for expensive redesigns. Further, the use of the embodiments of the invention provides information that the network can obtain from the UE and thus, provides more efficient network operation. The use of the secondary (or tertiary or quaternary) carrier without the need for separate synchronization signals increases system performance by efficiently using system resources.

Although various embodiments of the present invention and its advantages have been described in detail, it should be understood that various changes, substitutions and alterations can be made herein without departing from the spirit and scope of the invention as defined by the appended claims.

Moreover, the scope of the present application is not intended to be limited to the particular embodiments of the process, machine, manufacture, and composition of matter, or means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. An apparatus, comprising:
   at least one processor; and
   at least one memory including computer program code;
   the at least one memory and the computer program code configured to, with the at least one processor, cause the apparatus at least to perform:
      communicating over an air interface using multiple carriers for high speed uplink packet access to one or more active cells;
      receiving an active set update message over the air interface from an active cell using a first active carrier indicating at least one parameter of a co-allocated carrier; and
      configuring a time-offset for a finger of a RAKE receiver directed towards the co-allocated carrier responsive to said at least one parameter.

2. The apparatus according to claim 1 wherein the at least one memory including the computer program code is configured to, with the at least one processor, cause the apparatus to receive at least corresponding pilot channel information for the co-allocated carrier.

3. The apparatus according to claim 1 wherein the at least one memory including the computer program code is configured to, with the at least one processor, cause the apparatus to receive the active set update message comprising at least one information element for the co-allocated carrier selected from primary common pilot channel, cell identification, and the single-frequency-network to single-frequency network time difference.

4. The apparatus according to claim 1 wherein the at least one memory including the computer program code is configured to, with the at least one processor, cause the apparatus to receive a primary carrier from a first transceiver over the air interface, and to receive the co-allocated carrier from a second transceiver using information received in the active set update message.

5. The apparatus according to claim 1 wherein the at least one memory including the computer program code is configured to, with the at least one processor, cause the apparatus to transmit high speed uplink packet access messages over the air interface using a primary carrier.

6. The apparatus according to claim 5 wherein the at least one memory including the computer program code is configured to, with the at least one processor, further cause the apparatus to transmit high speed uplink packet access messages over the air interface using a secondary carrier indicated as a co-allocated carrier by information received in the active set update message.

7. The apparatus according to claim 1 wherein the at least one memory including the computer program code is further configured to, with the at least one processor, cause the apparatus to at least perform:
   receiving information in the active set update message indicating the location of a co-allocated carrier;
   transmitting a first high speed uplink packet access message over the air interface using a primary carrier; and
   transmitting a second high speed uplink packet access message over the air interface using a co-allocated secondary carrier.

8. The apparatus according to claim 7 wherein the at least one memory including the computer program code is configured to, with the at least one processor, cause the apparatus to at least perform:
   transmitting the first high speed uplink package access message to a transceiver corresponding to a first cell in a cellular network; and
   transmitting the second high speed uplink packet access message to a second transceiver corresponding to a second cell in a cellular network.

9. A computer program product comprising a program code stored in a tangible form in a computer readable medium configured to cause an apparatus to at least perform:
   transmitting multiple carrier high speed package access messages on at least a primary carrier and a co-allocated secondary carrier over an air interface;
   receiving a active set update message over the air interface from an active cell on one of the primary and secondary carriers, the active set update message including information indicating at least one parameter of a co-allocated carrier;
   configuring a time-offset for a finger of a RAKE receiver within the apparatus, directed towards the co-allocated carrier responsive to said at least one parameter; and
   transmitting a high speed uplink packet access message on the co-allocated carrier over the air interface.

10. The computer program product according to claim 9 wherein the program code stored in the computer readable medium is configured to cause the apparatus to at least perform:
   receiving at least corresponding pilot channel information for the co-allocated carrier.

11. The computer program product according to claim 9 wherein the program code stored in the computer readable medium is configured to cause the apparatus to at least perform:
   receiving information in the active set update message indicating the location of a co-allocated carrier;
   transmitting a first high speed uplink packet access message over the air interface using a primary carrier; and
   transmitting a second high speed uplink packet access message over the air interface using a co-allocated secondary carrier.

12. The computer program product according to claim 9 wherein the program code stored in the computer readable medium is configured to cause the apparatus to at least perform: causing the apparatus to at least communicate high speed uplink packet access messages over a plurality of co-allocated carriers, the plurality being greater than two.

13. The computer program product according to claim 9 wherein the at least one memory including the computer program code is configured to, with the at least one processor, cause the apparatus to at least provide a radio resource over several channels using the unlicensed frequency spectrum.

14. An apparatus, comprising:
   at least one processor; and
   at least one memory including computer program code, the at least one memory and the computer program code configured to, with the at least one processor, cause the apparatus at least to perform:
   communicating high speed uplink packet access messages over multiple carriers over an air interface;
   receiving an active set update message over the air interface from an active cell using a first active carrier indicating at least one parameter of co-allocated carriers;
   configuring a time-offset for a finger of a RAKE receiver within the apparatus, directed towards the co-allocated carriers responsive to said at least one parameter; and
   locating the co-allocated carriers using information received in the active set update message.

15. A method, comprising:
   transmitting high speed uplink packet access messages to a transceiver over an air interface using a primary carrier;
   receiving an active set update message over the primary carrier, the active set update message including information indicating at least one parameter of a co-allocated secondary carrier;
   configuring a time-offset for a finger of a RAKE receiver within the apparatus, directed towards the co-allocated secondary carrier responsive to said at least one parameter; and
   transmitting high speed uplink packet access messages to a transceiver over the air interface using the secondary carrier.

16. The method of claim 15 further comprising transmitting the high speed uplink packet access messages over the air interface to a second transceiver using the secondary carrier.

17. The method of claim 15 wherein the active set update message includes information about the co-allocated secondary carrier comprising at least one selected from primary common pilot channel, cell identification, and the single-frequency-network to single-frequency network time difference for the secondary carrier.

* * * * *